(12) United States Patent
Imani

(10) Patent No.: US 10,942,908 B2
(45) Date of Patent: Mar. 9, 2021

(54) PRIMARY KEY DETERMINATION

(71) Applicant: BUSINESS OBJECTS SOFTWARE LTD., Dublin (IE)

(72) Inventor: Mahsa Imani, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 305 days.

(21) Appl. No.: 16/247,345

(22) Filed: Jan. 14, 2019

(65) Prior Publication Data

US 2020/0226111 A1 Jul. 16, 2020

(51) Int. Cl.
*G06F 16/22* (2019.01)
*G06F 16/28* (2019.01)

(52) U.S. Cl.
CPC ........ *G06F 16/221* (2019.01); *G06F 16/2282* (2019.01); *G06F 16/288* (2019.01)

(58) Field of Classification Search
CPC ... G06F 16/221; G06F 16/288; G06F 16/2282
USPC ........................................................ 707/741
See application file for complete search history.

(56) References Cited

U.S. PATENT DOCUMENTS

| | | | | |
|---|---|---|---|---|
| 5,995,957 | A * | 11/1999 | Beavin | G06F 16/24545 |
| 9,104,784 | B2 * | 8/2015 | Nelke | G06F 16/2272 |
| 2003/0213316 | A1 * | 11/2003 | Harvey | G06F 16/288 |
| | | | | 73/866.4 |
| 2007/0061287 | A1 * | 3/2007 | Le | G06F 16/24539 |
| 2008/0249972 | A1 * | 10/2008 | Dillon | G06F 16/252 |
| | | | | 706/46 |
| 2011/0208748 | A1 * | 8/2011 | Chaudhuri | G06F 16/217 |
| | | | | 707/748 |
| 2013/0226940 | A1 * | 8/2013 | Gorelik | G06F 16/211 |
| | | | | 707/754 |
| 2015/0074117 | A1 * | 3/2015 | Gorelik | G06F 16/24544 |
| | | | | 707/745 |
| 2016/0078070 | A1 * | 3/2016 | Tran | G06F 16/24545 |
| | | | | 707/600 |
| 2017/0024421 | A1 * | 1/2017 | Kim | G06F 16/2282 |

OTHER PUBLICATIONS

Tauzovich, Branka, "An Expert System Approach to Database Design", Database and Expert Systems Application—Proc. of the International Conf. in Vienna, Austria, Springer-Verlag, © 1990, pp. 322-326.*

Cuadra, Dolores, et al., "Guidelines for representing complex cardinality constraints in binary and ternary relationship", Software and Systems Modeling, vol. 12, Issue 4, Springer, Oct. 2013, pp. 871-889.*

* cited by examiner

*Primary Examiner* — Robert Stevens
(74) *Attorney, Agent, or Firm* — Buckley, Maschoff & Talwalkar LLC

(57) ABSTRACT

A database system includes a first table comprising a plurality of columns and a plurality of column values associated with each of the plurality of columns. For each of the plurality of columns, a structural relationship is determined with each other of the plurality of columns based on the plurality of column values associated with each of the plurality of columns. One or more of the plurality of columns comprising a primary key of the first table are determined based on the structural relationships.

18 Claims, 10 Drawing Sheets

| | Name | SQL Data Type | Di... | Column Store Data Type |
|---|---|---|---|---|
| 1 | Account.ID | NVARCHAR | 256 | STRING |
| 2 | Customer_Name.ID | NVARCHAR | 256 | STRING |
| 3 | Row_ID.ID | NVARCHAR | 256 | STRING |
| 4 | Customer_Segment.ID | NVARCHAR | 256 | STRING |
| 5 | Sector.ID | NVARCHAR | 256 | STRING |
| 6 | Country.ID | NVARCHAR | 256 | STRING |
| 7 | Customer_Status.ID | NVARCHAR | 256 | STRING |
| 8 | Annual_Speed.ID | NVARCHAR | 256 | STRING |
| 9 | Length_of_Sales_Cycle.ID | NVARCHAR | 256 | STRING |
| 10 | Product_Name.ID | NVARCHAR | 256 | STRING |
| 11 | Contract_Level.ID | NVARCHAR | 256 | STRING |
| 12 | Sales_Manager.ID | NVARCHAR | 256 | STRING |
| 13 | Compelling_Event.ID | NVARCHAR | 256 | STRING |
| 14 | RFP.ID | NVARCHAR | 256 | STRING |
| 15 | Sales_Engineer_Engage... | NVARCHAR | 256 | STRING |
| 16 | Services_Included.ID | NVARCHAR | 256 | STRING |
| 17 | Date.DATE | DATE | | DAYDATE |
| 18 | Sales_Above_100k.ID | NVARCHAR | 256 | STRING |
| 19 | Version.ID | NVARCHAR | 300 | STRING |
| 20 | SignedData | DECIMAL | 31,7 | FIXED |

FIG. 5

600 \
Ordered List
Row_ID
Customer_Name
Country
Sector
Annual_Speed
. . .

610 \
Candidate

620 \
Ignored

*FIG. 6A*

600 \
Ordered List
Row_ID
Customer_Name
Country
Sector
Annual_Speed
. . .

610 \
Candidate
Row_ID

620 \
Ignored
Customer_Name

*FIG. 6B*

600 \
Ordered List
Row_ID
Customer_Name
Country
Sector
Annual_Speed
. . .

610 \
Candidate
Row_ID

620 \
Ignored
Customer_Name
Country

*FIG. 6C*

600  
Ordered List  
Row_ID  
Customer_Name  
Country  
Sector  
Annual_Speed  
. . .

610  
Candidate  
Row_ID

620  
Ignored  
Customer_Name  
Country  
Sector  
Annual_Speed

*FIG. 6D*

600  
Ordered List  
Row_ID  
Customer_Name  
Country  
Sector  
Annual_Speed  
. . .

610  
Candidate  
Row_ID  
Sales_Above_100k

620  
Ignored  
Customer_Name  
Country  
Sector  
Annual_Speed  
. . .

*FIG. 6E*

PRIMARY KEY DETERMINATION

BACKGROUND

In a relational database table, a primary key is a subset of one or more table columns whose values, taken together, uniquely identify each record in the table. A database table may include more than one subset of table columns which uniquely identifies each record in the table, and which could therefore be used as a primary key.

Identification of a primary key is useful in many circumstances. For example, some database calculations may target specific rows of a table by including the primary key in the calculation context. An identifier of a primary key may be stored within metadata defining the table and referenced during such calculations or other transactions involving the table. The primary key of a table is usually determined by the database administrator based on the domain of the data, professional experience, and/or manual execution of count queries.

In many situations, the primary key of a table is unknown. Moreover, the primary key may become invalid if the table data changes significantly (e.g., more dimensions or more rows are added). To identify a valid primary key, one approach simply defines the primary key as the combination of all the columns in the table. However, every additional column in the primary key leads to exponential increases in resource consumption for calculations/transactions which use the primary key. Another approach generates all the possible single- and multi-column (i.e., composite) keys and determines which keys are associated with a count equal to number of rows in the table. This exhaustive approach is associated with unacceptable levels of time and memory complexity for most database tables.

Systems are therefore needed to efficiently and scalably identify a primary key.

BRIEF DESCRIPTION OF THE DRAWINGS

FIG. 5 depicts column metadata of a database table according to some embodiments.

FIGS. 6A through 6E depict arrays of database column names during determination of a primary key of a database table according to some embodiments.

DETAILED DESCRIPTION

According to some embodiments, a primary key is determined incrementally and efficiently using heuristics based on dataset statistics. The dataset statistics are determined based on actual data stored in the table, and may include column cardinality and structural relationships between the columns. Some systems may generate these statistics for all tables and regenerate the statistics each time a table or its data changes.

Embodiments may be significantly more efficient than running a count query for every possible solution (i.e., every combination of columns) and comparing the results against the number of table rows. For example, some embodiments may reduce the time complexity of primary key determination from exponential (e.g., $O(M*2^N)$) to polynomial $O(N^2)$, where M is number of rows and N is number of columns in the table. Moreover, some embodiments may reduce the memory complexity from $O(M)$ to $O(N)$, where the number of rows (M) is usually significantly larger than the number of columns (N). Since the complexity of some embodiment is independent of the number rows in the table (M), embodiments may execute more efficiently on arbitrary-sized tables than prior approaches.

Figure 1:
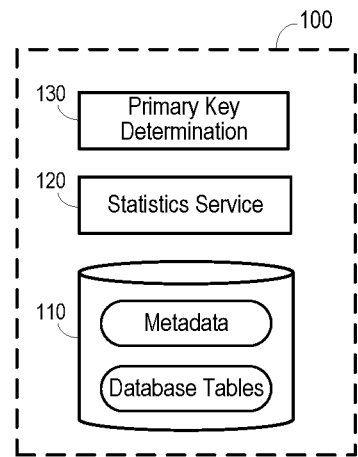
FIG. 1 is a block diagram of a database system according to some embodiments.

FIG. 1 is a block diagram of database system 100 according to some embodiments. Database system 100 comprises data store 110, statistics service 120 and primary key determination component 130. Database system 100 may comprise components other than those depicted in FIG. 1.

Database system 100 may comprise any type of database that is or becomes known, and may be implemented using an integrated or distributed architecture. A more specific example of database system 100 is described below with respect to FIG. 9.

Data store 110 includes database tables and metadata. The database tables may store any suitable data related to an enterprise, and the metadata defines the structure and attributes of the data stored therein. The metadata may define a database schema including multiple database tables, logical relationships between the multiple tables, columns and column types of each database table, primary and foreign keys of each database table, and any other attributes.

Data store 110 may comprise a distributed architecture and may include any combination of volatile, non-volatile and persistent memory. Data store 110 may be replicated, indexed and backed up in any suitable manner.

Statistics service 120 generates statistics by analyzing the data stored in the database tables of data store 110. The generated statistics may be stored within dedicated database tables of data store 110. The statistics may be used by various components of database system 100 to optimize operation of database system 100. For example, statistics generated by statistics service 120 may be used to dynamically partition tables, generate backups, and determine query execution plans. The statistics may include a column cardinality (i.e., the number of distinct values stored in a given table column) and statistics describing structural relationships between table columns, as will be described in more detail below.

Primary key determination component 130 may utilize statistics generated by statistics service 120 to determine primary keys according to some embodiments. Primary key determination component 130 may be a component of a database server application or a standalone component providing functionality to database server applications. Primary key determination component 130 may comprise a service which executes in the background (e.g., similarly to statistics service 120) during operation of database system 100. Any primary keys determined by primary key determination component 130 may be identified within metadata of data store 110, in association with their corresponding database tables.

Figure 2:
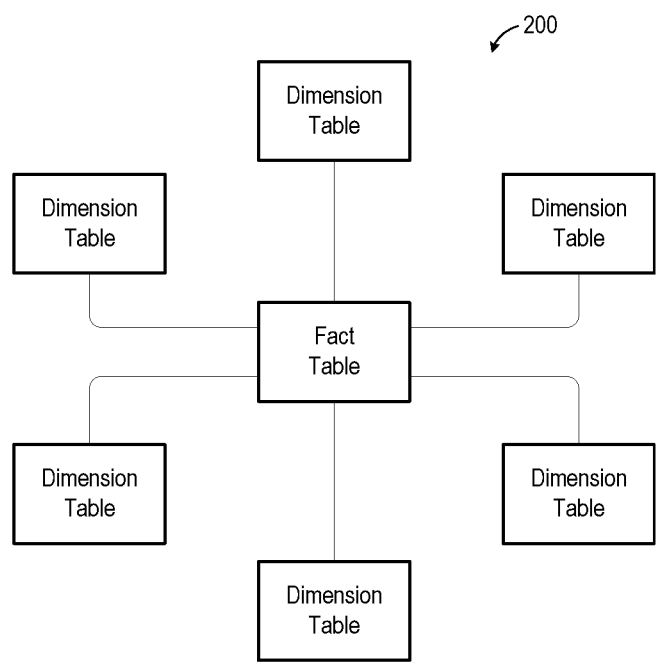
FIG. 2 illustrates a database table schema according to some embodiments.

FIG. 2 illustrates data schema 200 according to some embodiments. Schema 200 is a star schema as is known in the art, but embodiments are not limited thereto. Schema 200 includes a fact table joined to a plurality of dimension tables. A fact table consists of foreign key columns and measure columns. The foreign key columns specify joins with columns of the dimension tables (e.g., City, Product, Year) and the measure columns contain the data that is being analyzed (e.g., Sales, Profit).

Figure 3A:
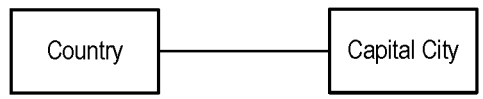
FIGS. 3A through 3C illustrate structural relationships between table columns according to some embodiments.
Figure 3B:
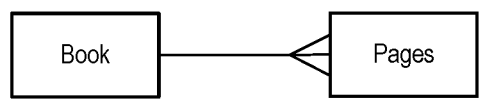
Figure 3C:
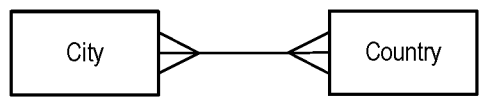

FIGS. 3A through 3C depict structural relationships between table columns. Such structural relationships may be determined by a statistics service based on values stored within the table columns. Generally, one column may be related to another column in a "one-to-many", "many-to-many" or "one-to-one" structural relationship.

FIG. 3A depicts a one-to-one structural relationship according to some embodiments. In the specific example, a given table includes a Country column and a Capital City column. Each country listed in the Country column is always associated with the same one capital city in the Capital City column, and each capital city listed in the Capital City column is always associated with the same one country in the Country column.

In a one-to-many structural relationship as depicted in FIG. 3B, the table includes a Book column and a Pages column. Each book listed in the Book column may be associated with any one of many pages, but each page listed in the Page column is always associated with the same one book in the Book column. In this regard, the one-to-many (or many-to-one) structural relationship defines a parent (one)-child (many) relationship between the columns.

FIG. 3C depicts a many-to-many relationship. A city listed in a City column may be associated with any of several possible countries in a Country column (e.g., Vancouver Canada and Vancouver, USA), while a country listed in the Country column may be associated with any number of cities in the City column.

Figure 4:
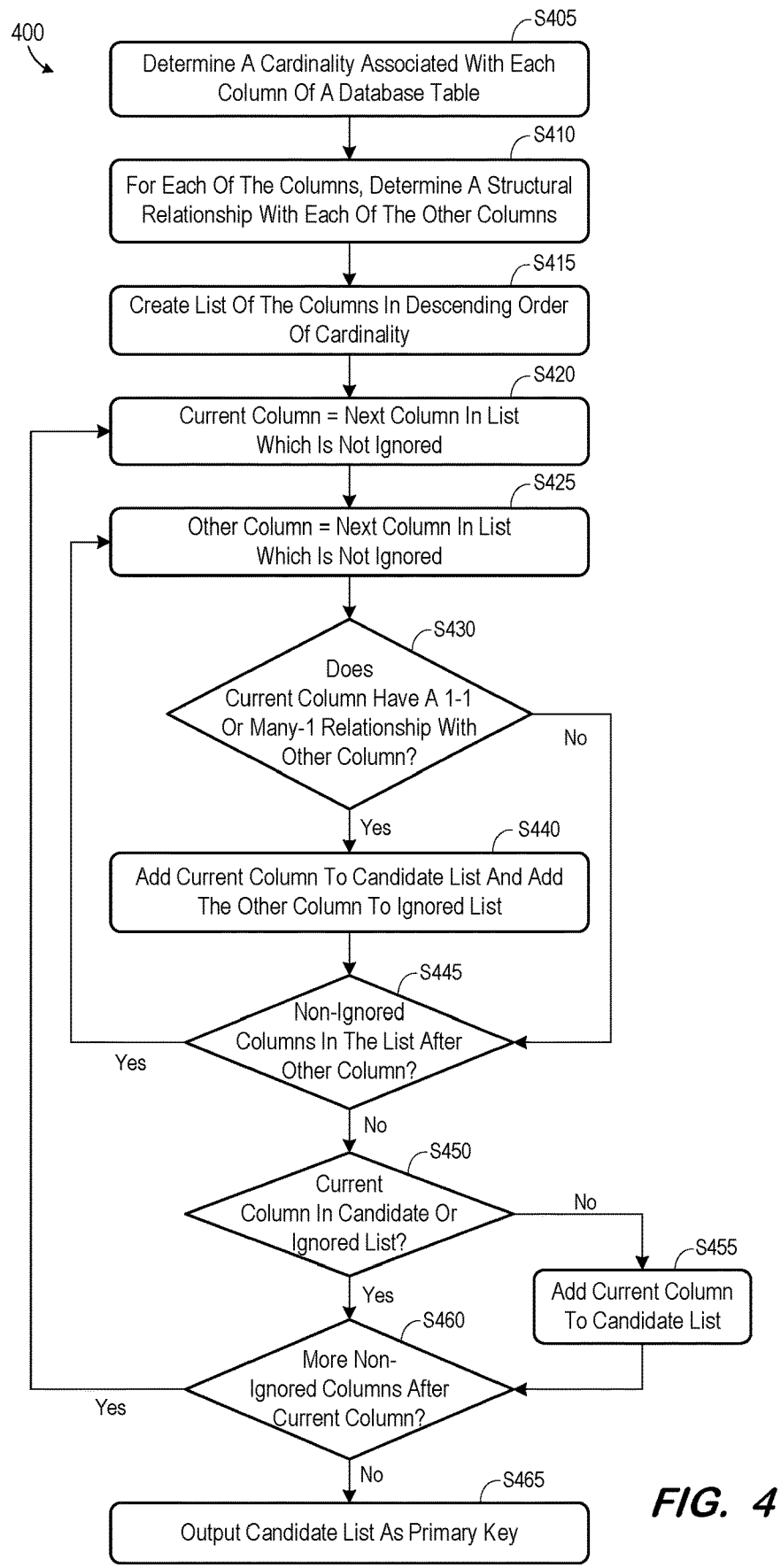
FIG. 4 is a flow diagram of a process to determine a primary key of a database table according to some embodiments.

FIG. 4 comprises a flow diagram of process 400 according to some embodiments. Process 400 may be executed to determine a primary key of a database table.

In some embodiments, various hardware elements of system 100 execute program code to perform process 400. Process 400 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S405, a cardinality associated with each column of a database table is determined. As described above, embodiments may employ a statistics service which determines the number of distinct values stored within columns of database tables. The determination may be executed periodically, in response to triggering events (e.g., change in table schema, addition or deletion of a certain number or percentage of table rows), and/or with respect to only specified tables and columns.

FIG. 5 shows column metadata 500 for a table stored within database tables of data store 110. According to some embodiments, primary key determination component 130 executes S405 by acquiring cardinality metadata stored by statistics service 120 in data store 110. The cardinality metadata indicates the cardinality of each column specified in column metadata 500. For example, the following Javascript Object Notation (JSON) cardinality metadata may be acquired at S405:

```
{
  "Customer_Name.ID" : {
    "id" : "Customer Name.ID",
    "nonLeafMembers" : { },
    "masterTableName" :
"t.3.SalesDemoData2017Planning::MSTR_Customer_Name",
    "cardinality" : 4934
  },
  "Row_ID.ID" : {
    "id" : "Row_ID.ID",
    "nonLeafMembers" : { },
    "masterTableName" : "t.3.SalesDemoData2017Planning::MSTR_Row_ID",
    "cardinality" : 5000
  },
  "Customer_Segment.ID" : {
    "id" : "Customer_Segment.ID",
    "nonLeafMembers" : { },
    "masterTableName" :
"t.3.SalesDemoData2017Planning::MSTR_Customer_Segment",
    "cardinality" : 3
  },
  "Sector.ID" : {
    "id" : "Sector.ID",
    "nonLeafMembers" : { },
    "masterTableName" : "t.3.SalesDemoData2017Planning::MSTR_Sector",
    "cardinality" : 9
  },
  "Country.ID" : {
    "id" : "Country.ID",
    "nonLeafMembers" : { },
    "masterTableName" : "t.3.SalesDemoData2017Planning::MSTR_Country",
    "cardinality" : 10
  },
  "Customer_Status.ID" : {
    "id" : "Customer Status.ID",
    "nonLeafMembers" : { },
    "masterTableName" :
"t.3.SalesDemoData2017Planning::MSTR_Customer _Status",
    "cardinality" : 3
  },
  "Annual_Speed.ID" : {
    "id" : "Annual_Speed.ID",
    "nonLeafMembers" : { },
    "masterTableName" :
"t.3.SalesDemoData2017Planning::MSTR_Annual _Speed",
    "cardinality" : 5
  },
  "Length_of_Sales_Cycle.ID" : {
    "id" : "Length_of _Sales_Cycle.ID",
    "nonLeafMembers" : { },
    "masterTableName" :
"t.3.SalesDemoData2017Planning::MSTR_Length_of_Sales_Cycle",
    "cardinality" : 5
  },
  "Product_Name.ID" : {
    "id" : "Product_Name.ID",
    "nonLeafMembers" : { },
    "masterTableName" :
"t.3.SalesDemoData2017Planning::MSTR_Product_Name",
    "cardinality" : 12
  },
  "Contract_Level.ID" : {
    "id" : "Contract_Level.ID",
    "nonLeafMembers" :{ },
    "masterTableName" :
"t.3.SalesDemoData2017Planning::MSTR_Contract_Level",
    "cardinality" : 3
  },
```

-continued

```
    "Sales_Manager.ID" : {
        "id" : "Sales_Manager.ID",
        "nonLeafMembers" : { },
        "masterTableName" :
"t.3.SalesDemoData2017Planning::MSTR_Sales_Manager",
        "cardinality" : 3
    },
    "Compelling_Event.ID" : {
        "id" : "Compelling_Event.ID",
        "nonLeafMembers" : { },
        "masterTableName" :
"t.3.SalesDemoData2017Planning::MSTR_Compelling_Event",
        "cardinality" : 2
    },
    "RFP.ID" : {
        "id" : "RFP.ID",
        "nonLeafMembers" : { },
        "masterTableName" : "t.3.SalesDemoData2017Planning::
MSTR_RFP",
        "cardinality" : 2
    },
    "Sales_Engineer_Engaged.ID" : {
        "id" : "Sales_Engineer_Engaged.ID",
        "nonLeafMembers" : { },
        "masterTableName" :
"t.3.SalesDemoData2017Planning::MSTR_Sales_Engineer_
Engaged",
        "cardinality" : 2
    },
    "Services_Included.ID" : {
        "id" : "Services_Included.ID",
        "nonLeafMembers" : { },
        "masterTableName" :
"t.3.SalesDemoData2017Planning::MSTR_Services_Included",
        "cardinality" : 2
    },
    "Sales_Above_100k.ID" : {
        "id" : "Sales_Above_100k.ID",
        "nonLeafMembers" : { },
        "masterTableName" :
"t.3.SalesDemoData2017Planning::MSTR_Sales_Above_100k",
        "cardinality" : 2
    }
}
```

S410 includes determination, for each of the columns, of a structural relationship with each other of the columns. S410 may proceed as described with respect to S405, in that the structural relationships may be previously-determined by statistics service 120, stored as metadata within data store 110, and acquired therefrom by component 130 at S410.

The determination at S410 is typically based on the actual values stored in each of the columns. According to some embodiments, the structural relationship is defined by the average number of distinct values in a second column for each distinct value of a first column. Continuing the present example, the following JSON structural relationship metadata may be acquired at S410:

```
{
    "Customer_Name.ID" {
        "id": "Customer_Name.ID",
        "nonLeafMembers": { },
        "masterTableName":
"t.3.SalesDemoData2017Planning::MSTR_Customer_
Name",
        "relationships": {
            "Row_ID.ID": 1.0264,
            "Customer_Segment.ID": 1.016482,
            "Sector.ID": 1.022841,
            "Country.ID": 1.022841,
            "Customer_Status.ID": 1.017677,
            "Annual_Speed.ID": 1.021651,
            "Length_of_Sales_Cycle.ID": 1.019269,
            "Product_Name.ID": 1.024819,
            "Contract_Level.ID": 1.018473,
            "Sales_Manager.ID": 1.018473,
            "Compelling_Event.ID": 1.012087,
            "RFP.ID": 1.013687,
            "Sales_Engineer_Engaged.ID": 1.013287,
            "Services_Included.ID": 1.011686,
            "Sales_Above_100 k.ID": 1.166821
        }
    },
    "Row_ID.ID":{
        "id": "Row_ID.ID",
        "nonLeafMembers": { }
        "masterTableName": "t.3.SalesDemoData2017Planning::
MSTR_Row_ID",
        "relationships": {
            "Customer_Name.ID": 1,
            "Customer_Segment.ID": 1,
            "Sector.ID": 1,
            "Country.ID": 1,
            "Customer_Status.ID": 1,
            "Annual_Speed.ID": 1,
            "Length_of_Sales_Cycle.ID": 1,
            "Product_Name.ID": 1,
            "Contract_Level.ID": 1,
            "Sales_Manager.ID": 1,
            "Compelling_Event.ID": 1,
            "RFP.ID": 1,
            "Sales_Engineer_Engaged.ID": 1,
            "Services_Included.ID": 1,
            "Sales_Above_100 k.ID": 1.159396
        }
    },
    "Customer_Segment.ID":{
        "id": "Customer_Segment.ID",
        "nonLeafMembers": { },
        "masterTableName":
"t.3.SalesDemoData2017Planning::MSTR_Customer_Seg-
ment",
        "relationships": {
            "Customer_Name.ID": 1719.217889,
            "Row_ID.ID": 1728.6896,
            "Sector.ID": 9,
            "Country.ID": 10,
            "Customer_Status.ID": 3,
            "Annual_Speed.ID": 5,
            "Length_of_Sales_Cycle.ID": 5,
            "Product_Name.ID": 9,
            "Contract_Level.ID": 3,
            "Sales_Manager.ID": 3,
            "Compelling_Event.ID": 2,
            "RFP.ID": 2,
            "Sales_Engineer_Engaged.ID": 2,
            "Services_Included.ID": 2,
            "Sales_Above_100 k.ID": 2
        }
    },
    "Sector.ID":{
        "id": "Sector.ID",
        "nonLeafMembers": {×}
        "masterTableName": "t.3.SalesDemoData2017Planning::
MSTR_Sector",
        "relationships": {
            "Customer_Name.ID": 555.129032,
            "Row_ID.ID": 556.1496,
            "Customer_Segment.ID": 3,
            "Country.ID": 10,
```

```
    "Customer_Status.ID": 3,
    "Annual_Speed.ID": 5,
    "Length_of_Sales_Cycle.ID": 5,
    "Product_Name.ID": 9,
    "Contract_Level.ID": 3,
    "Sales_Manager.ID": 3,
    "Compelling_Event.ID": 2,
    "RFP.ID": 2,
    "Sales_Engineer_Engaged.ID": 2,
    "Services_Included.ID": 2,
    "Sales_Above_100 k.ID": 2
  }
},
"Country.ID" {
"id": "Country.ID",
"nonLeafMembers": { }
"masterTableName": "t.3.SalesDemoData2017Planning::MSTR_Country",
"relationships": {
    "Customer_Name.ID": 499.477659,
    "Row_ID.ID": 500.3612,
    "Customer_Segment.ID": 3,
    "Sector.ID": 9,
    "Customer_Status.ID": 3,
    "Annual_Speed.ID": 5,
    "Length_of_Sales_Cycle.ID": 5,
    "Product_Name.ID": 9,
    "Contract_Level.ID": 3,
    "Sales_Manager.ID": 3,
    "Compelling_Event.ID": 2,
    "RFP.ID": 2,
    "Sales_Engineer_Engaged.ID" 2,
    "Services_Included.ID": 2,
    "Sales_Above_100 k.ID": 2
  }
},
"Customer_Status.ID" {
"id": "Customer_Status.ID",
"nonLeafMembers": { },
"masterTableName":
"t.3.SalesDemoData2017Planning::MSTR_Customer_Status",
"relationships": {
    "Customer_Name.ID": 1674.769385,
    "Row_ID.ID": 1681.9148,
    "Customer_Segment.ID":3,
    "Sector.ID":9,
    "Country.ID": 10,
    "Annual_Speed.ID":5,
    "Length_of_Sales_Cycle.ID":5,
    "Product_Name.ID":9,
    "Contract_Level.ID": 3,
    "Sales_Manager.ID":3,
    "Compelling_Event.ID": 2,
    "RFP.ID": 2,
    "Sales_Engineer_Engaged.ID":2,
    "Services_Included.ID": 2,
    "Sales_Above_100 k.ID": 2
  }
},
"Annual_Speed.ID":{
"id": "Annual_Speed.ID",
"nonLeafMembers": { },
"masterTableName":
"t.3.SalesDemoData2017Planning::MSTR_Annual_Speed",
    "relationships": {
      "Customer_Name.ID":998.926222,
      "Row_ID.ID": 1001.402,
      "Customer_Segment.ID":3,
      "Sector.ID":9,
      "Country.ID": 10,
      "Customer_Status.ID":3,
      "Length_of_Sales_Cycle.ID":5,
      "Product_Name.ID":9,
      "Contract_Level.ID": 3,
      "Sales_Manager.ID":3,
      "Compelling_Event.ID":2,
      "RFP.ID":2,
      "Sales_Engineer_Engaged.ID":2,
      "Services_Included.ID":2,
      "Sales_Above_100 k.ID":2
    }
  },
  "Length_of_Sales_Cycle.ID":{
  "id": "Length_of_Sales_Cycle.ID",
  "nonLeafMembers": { },
  "masterTableName":
  "t.3.SalesDemoData2017Planning::MSTR_Length_of_Sales_Cycle",
    "relationships": {
      "Customer_Name.ID": 1252.341629,
      "Row_ID.ID": 1258.7904,
      "Customer_Segment.ID":3,
      "Sector.ID":9,
      "Country.ID": 10,
      "Customer_Status.ID":3,
      "Annual_Speed.ID":5,
      "Product_Name.ID":9,
      "Contract_Level.ID": 3,
      "Sales_Manager.ID":3,
      "Compelling_Event.ID":2,
      "RFP.ID":2,
      "Sales_Engineer_Engaged.ID":2,
      "Services_Included.ID":2,
      "Sales_Above_100 k.ID": 2
    }
  },
  "Product_Name.ID": {
  "id": "Product_Name.ID",
  "defaultHierarchy": "Product_Type",
  "nonLeafMembers": { }
  "masterTableName":
  "t.3.SalesDemoData2017Planning::MSTR_Product_Name",
    "relationships": {
      "Customer_Name.ID":556.511609,
      "Row_ID.ID": 556.9264,
      "Customer_Segment.ID":3,
      "Sector.ID":9,
      "Country.ID": 10,
      "Customer_Status.ID":3,
      "Annual_Speed.ID":5,
      "Length_of_Sales_Cycle.ID":5,
      "Contract_Level.ID": 3,
      "Sales_Manager.ID":3,
      "Compelling_Event.ID":2,
      "RFP.ID":2,
      "Sales_Engineer_Engaged.ID" 2,
      "Services_Included.ID": 2,
      "Sales_Above_100 k.ID": 2
    }
  },
```

```
"Contract_Level.ID" {
"id": "Contract_Level.ID",
"nonLeafMembers": { },
"masterTableName":
"t.3.SalesDemoData2017Planning::MSTR_Contract_Level",
    "relationships": {
        "Customer_Name.ID": 1807.755421,
        "Row_ID.ID": 1816.5156,
        "Customer_Segment.ID":3,
        "Sector.ID":9,
        "Country.ID": 10,
        "Customer_Status.ID":3,
        "Annual_Speed.ID":5,
        "Length_of_Sales_Cycle.ID":5,
        "Product_Name.ID":9,
        "Sales_Manager.ID": 1,
        "Compelling_Event.ID": 2,
        "RFP.ID": 2,
        "Sales_Engineer_Engaged.ID":2,
        "Services_Included.ID":2,
        "Sales_Above_100 k.ID":2
    }
},
"Sales_Manager.ID":{
"id": "Sales_Manager.ID",
"nonLeafMembers": { },
"masterTableName":
"t.3.SalesDemoData2017Planning::MSTR_Sales_Manager",
    "relationships" {
        "Customer_Name.ID": 1807.755421,
        "Row_ID.ID": 1816.5156,
        "Customer_Segment.ID":3,
        "Sector.ID":9,
        "Country.ID": 10,
        "Customer_Status.ID":3,
        "Annual_Speed.ID":5,
        "Length_of_Sales_Cycle.ID":5,
        "Product_Name.ID":9,
        "Contract_Level.ID": 1,
        "Compelling_Event.ID": 2,
        "RFP.ID": 2,
        "Sales_Engineer_Engaged.ID":2,
        "Services_Included.ID": 2,
        "Sales_Above_100 k.ID": 2
    }
},
"Compelling_Event.ID":{
"id": "Compelling_Event.ID",
"nonLeafMembers": { },
"masterTableName":
"t.3.SalesDemoData2017Planning::MSTR_Compelling_Event",
    "relationships": {
        "Customer_Name.ID":2482.36261,
        "Row_ID.ID": 2500.2704,
        "Customer_Segment.ID":3,
        "Sector.ID":9,
        "Country.ID": 10,
        "Customer_Status.ID":3,
        "Annual_Speed.ID":5,
        "Length_of_Sales_Cycle.ID":5,
        "Product_Name.ID":9,
        "Contract_Level.ID": 3,
        "Sales_Manager.ID":3,
        "RFP.ID":2,
        "Sales_Engineer_Engaged.ID": 2,
        "Services_Included.ID": 2,
        "Sales_Above_100 k.ID": 2
    }
},
"RFPID" {
"id": "RFPID",
"nonLeafMembers": { }
"masterTableName": "t.3.SalesDemoData2017Planning::MSTR_RFP",
    "relationships": {
        "Customer_Name.ID":2484.078904,
        "Row_ID.ID":2500.09,
        "Customer_Segment.ID":3,
        "Sector.ID":9,
        "Country.ID": 10,
        "Customer_Status.ID":3,
        "Annual_Speed.ID":5,
        "Length_of_Sales_Cycle.ID":5,
        "Product_Name.ID":9,
        "Contract_Level.ID": 3,
        "Sales_Manager.ID":3,
        "Compelling_Event.ID":2,
        "Sales_Engineer_Engaged.ID":2,
        "Services_Included.ID": 2,
        "Sales_Above_100 k.ID": 2
    }
},
"Sales_Engineer_Engaged.ID"
"id": "Sales_Engineer_Engaged.ID",
"nonLeafMembers": { },
"masterTableName":
"t.3.SalesDemoData2017Panning::MSTR_Sales_Engineer_Engaged",
    "relationships": {
        "Customer_Name.ID":2483.804509,
        "Row_ID.ID":2500.25,
        "Customer_Segment.ID":3,
        "Sector.ID":9,
        "Country.ID": 10,
        "Customer_Status.ID":3,
        "Annual_Speed.ID":5,
        "Length_of_Sales_Cycle.ID":5,
        "Product_Name.ID":9,
        "Contract_Level.ID": 3,
        "Sales_Manager.ID":3,
        "Compelling_Event.ID" 2,
        "RFP.ID": 2,
        "Services_Included.ID": 2,
        "Sales_Above_100 k.ID": 2
    }
},
"Services_Included.ID" {
"id": "Services_Included.ID",
"nonLeafMembers": { },
"masterTableName":
"t.3.SalesDemoData2017Planning::MSTR_Services_Included",
    "relationships": {
        "Customer_Name.ID":2481.979649,
        "Row_ID.ID":2500.5184,
        "Customer_Segment.ID":3,
        "Sector.ID":9,
        "Country.ID": 10,
        "Customer_Status.ID":3,
        "Annual_Speed.ID":5,
        "Length_of_Sales_Cycle.ID":5,
```

"Product_Name.ID":9,
"Contract_Level.ID": 3,
"Sales_Manager.ID":3,
"Compelling_Event.ID":2,
"RFP.ID":2,
"Sales_Engineer_Engaged.ID": 2,
"Sales_Above_100 k.ID":2
}
},
"Sales_Above_100 k.ID":{
"id": "Sales_Above_100 k.ID",
"nonLeafMembers": { }
"masterTableName":
"t.3.SalesDemoData2017Planning::MSTR_Sales_Above_100 k",
"relationships": {
"Customer_Name.ID":3465.675088,
"Row_ID.ID":3508.188661,
"Customer_Segment.ID":3,
"Sector.ID":9,
"Country.ID": 10,
"Customer_Status.ID":3,
"Annual_Speed.ID":5,
"Length_of_Sales_Cycle.ID":5,
"Product_Name.ID":9,
"Contract_Level.ID": 3,
"Sales_Manager.ID":3,
"Compelling_Event.ID":2,
"RFP.ID":2,
"Sales_Engineer_Engaged.ID": 2,
"Services_Included.ID":2
}
}
}
}

According to some embodiments, the determination of cardinalities and structural relationships comes at a computational cost. Process 400 therefore uses determined cardinalities and structural relationships which may already exist in the database system, or which may be determined fairly efficiently. As will be described below with respect to FIGS. 7 and 8, if the primary key determined by process 400 is insufficient (e.g., includes too many columns), cardinalities and structural relationships may be determined for various subsets of columns (i.e., the columns in the currently-determined primary key). The computational cost of some embodiments is reduced because these cardinalities and structural relationships are determined only if needed, and are determined with respect to only a subset of columns.

A list of the columns is created at S415. The list is ordered in descending order of cardinality. FIG. 6A shows a first five entries of ordered list 600 created at S415 based on the cardinality metadata shown above. FIG. 6A also shows candidate list 610 and ignored list 620, which may comprise pre-initialized arrays. Usage of candidate list 610 and ignored list 620 will be described below.

At S420, the "current" column is identified as a next column in the ordered list which is not in the ignored list. At the initial iteration of S420, the "next" column is the first column of the ordered list. Accordingly, in the present example, Row_ID is initially denoted as the current column at S420.

Next, at S425, the "other" column is identified as a next column in the ordered list which is not in the ignored list. In the present example, the next column in ordered list 600 is Customer_Name. The column Customer_Name is also "not ignored" because it is not present in ignored list 620. Accordingly, Customer_Name is determined to be the other column at S425.

At S430, it is determined whether the current column has a 1-to-1 or many-to-1 relationship with the other column. Based on the structural relationship metadata listed above, it is determined at S430 that the current column Row_ID has a 1-to-1 structural relationship with the other column Customer_Name. Therefore, at S440, the current column (i.e., Row_ID) is added to candidate list 610 and the other column (i.e., Customer_Name) is added to ignored list 620. FIG. 6B illustrates these updates to lists 600, 610 and 620.

Generally, the column Customer_Name may be ignored (i.e., not considered as part of the primary key) because each value of the Row_ID column uniquely identifies one value of the Customer_Name column. Accordingly, the use of Customer_Name column and the Row_ID column in the primary key would not provide any additional row-discriminative capability as compared to the use of the Row_ID column alone.

At S445, it is determined whether ordered list 600 includes any other non-ignored columns. In this regard, list 600 of FIG. 6B includes several other columns which are not present in ignored list 620. Flow therefore returns to S425 to identify a next "other" column in the ordered list (i.e., Country) and to determine at S430 whether the current column (i.e., Row_ID) has a 1-to-1 or many-to-1 relationship with the next other column. According to the present example, the column Row_ID has a 1-to-many structural relationship with the column Country, and the column Country is therefore added to ignored list 620 at S440, as shown in FIG. 6C. The current column Row_ID is not added to list 610 at S440 because list 610 already contains the column Row_ID.

Flow cycles between S425 and S445 to traverse list 600 with respect to the current column Row_ID. As shown in the structural relationship metadata above, the column Row_ID has a 1-to-1 or 1-to-many relationship with each other column, except for the column Sales_Above_100 k. Accordingly, as process 400 cycles between S425 and S445, each other column is added to ignored list 620 at S440 (as shown in FIG. 6D) until the column Sales_Above_100 k is identified as the "other" column at S425.

The column Row_ID has a many-to-many relationship with the column Sales_Above_100 k. In particular, as indicated by the structural relationship metadata, each value of the column Row_ID is, on average, associated with 1.159396 values of the column Sales_Above_100 k. Some embodiments may define a "many" relationship as any relationship with a value greater than 1, or may include a small error tolerance, for example defining a "many" relationship as any relationship with a value greater than 1.02.

Flow proceeds from S430 to S445 due to the many-to-many relationship between the column Row_ID and the column Sales_Above_100 k.

Flow proceeds from S445 to S450 once the current column has been evaluated against each other non-ignored column in candidate list 600. It is determined at S450 whether the current column is in the candidate list or the ignored list. If not (e.g., Row_ID is in the candidate list), flow continues to S460 to determine whether there are more columns in the list which follow the current column and which are not in the ignored list. In the present case, column Sales_Above_100 k is in list 600 and is not in ignored list 620. Flow then returns to S420 and proceeds as described above with respect to a new current column (i.e., Sales_Above_100 k). The new current column is a next-highest cardinality column in candidate list 600 which is not present in ignored list 620.

Flow proceeds to S450 since no other non-ignored columns follow Sales_Above_100 k in list 600. The column Sales_Above_100 k is added to the candidate list at S455, as shown in FIG. 6E.

Flow continues from S460 to S465 after each column of candidate list 600 has been evaluated as a current column or has been added to ignored list 620. At S465, the one or more columns listed in candidate list 610 are determined to comprise the primary key. The primary key may consist of one column or may be a composite primary key including two or more columns. The one or more columns are output to an application which requested determination of the primary key for the table and/or may be output to metadata describing the table.

Figure 7:
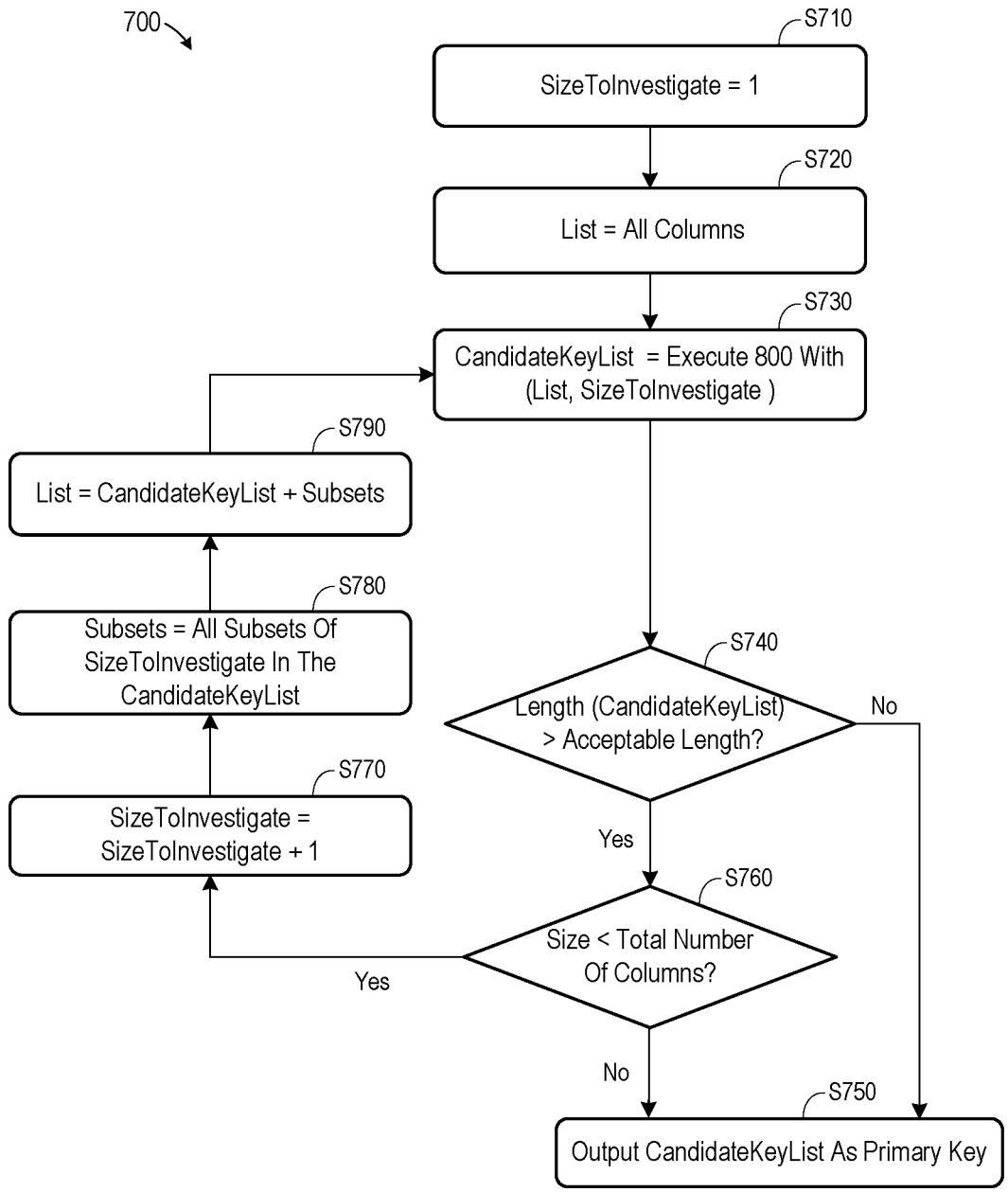
FIG. 7 is a flow diagram of a process to reduce the size of a candidate list of primary key columns according to some embodiments.
Figure 8:
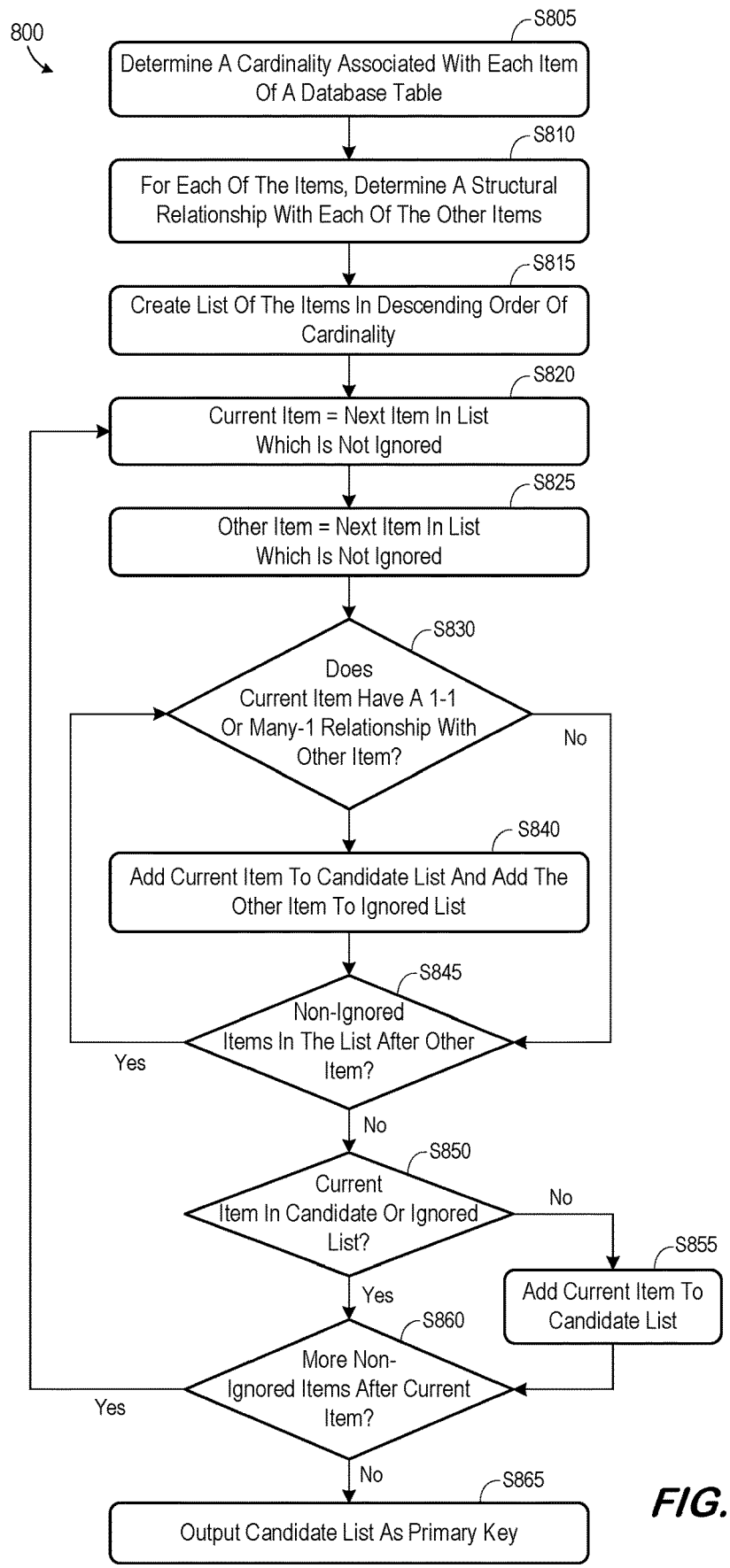
FIG. 8 is a flow diagram of a process to determine a primary key of a database table based on structural relationships between table columns and combinations of table columns according to some embodiments.

FIG. 7 is a flow diagram of process 700 for determining a primary key for a table based on structural relationships between subsets of columns. Process 700 is an extension of process 400 in that it provides further processing in a case that the primary key determined by process 400 is of an unacceptable length. Process 700 may determine a more efficient primary key than process 400 but may consume more processing resources.

At S710, a size of the column subsets to investigate is set to 1 and, at S720, a list is initialized to include all columns. Accordingly, the initial conditions of process 700 are similar to that described with respect to process 400. That is, all columns are to be considered and each column is to be considered individually with respect to each other individual column S730 comprises determination of a candidate list of columns of a composite primary key. S730 may comprise executing process 400 as described above, where SizeToInvestigate=1 and the list includes all columns. However, S730 is illustrated with respect to process 800 of FIG. 8. Process 800 is identical to process 400 except that "column" has been replaced with "item". As will be noted below, the "items" of process 800 may comprise subsets of one, two or more columns.

After the candidate list is determined at S730, it is determined at S740 whether a length of the candidate list (i.e., number of columns) is greater than an acceptable length. If not, the candidate list is output as the primary key at S750. If the length of the candidate list is unacceptable, and it is determined at S760 that the current SizeToInvestigate is less than the total number of columns, flow proceeds to S770.

The SizeToInvestigate is incremented at S770. Next, at S780, column subsets of the candidate list are determined having a size equal to the incremented SizeToInvestigate. In one example, the columns of the candidate list determined at S730 are {C1, C2, C3} and the value of SizeToInvestigate is two. Accordingly, the subsets {C1, C2}, {C1, C3}, and {C2, C3} are determined at S780.

A new list of items is defined at S790, including the current candidate list and the determined subsets. With respect to the above example, the new list includes {C1}, {C2}, {C3}, {C1, C2}, {C1, C3}, and {C2, C3}. Flow returns to S730 to execute process 800 with respect to the new list.

Specifically, a cardinality of each item in the new list is determined at S805 and structural relationships between each item and each other item (of which the item is not a subset) are determined at S810. For example, {C1} is subset of {C1, C2} and {C1, C3} and therefore structural relationships therebetween are not determined at S810. The structural relationships may be determined as described above, albeit while considering each subset of columns as a single column. Similarly, a cardinality of each subset may be determined as the number of distinct combinations of values stored in the columns of the subset. Flow therefore cycles between S730, S740, S760, S770, S780 and S790 until a candidate list of an acceptable length is determined at S740 or the SizeToInvestigate is determined to be equal to the size of all columns at S760.

Figure 9:
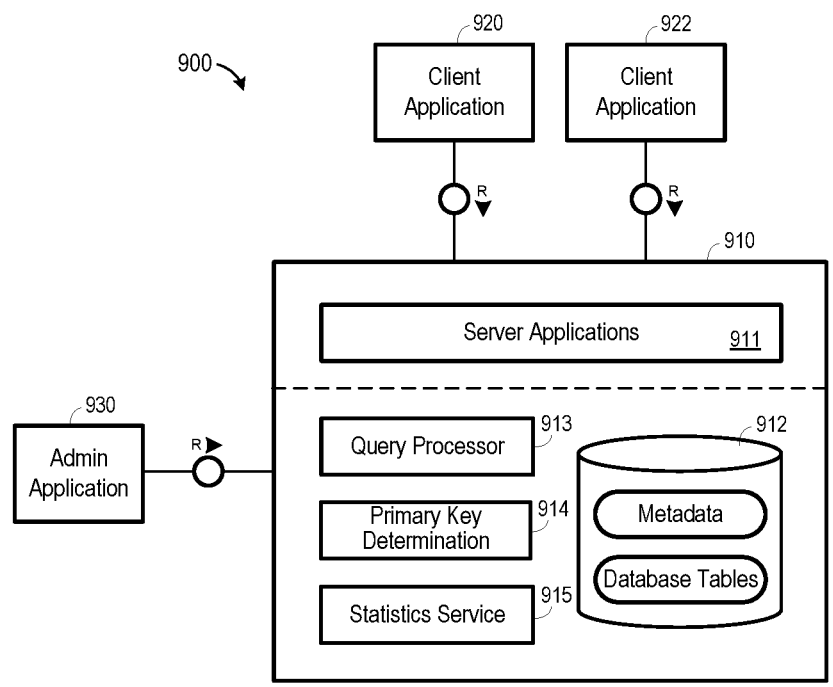
FIG. 9 is a block diagram of a database architecture according to some embodiments.

FIG. 9 is a block diagram of system 900 according to some embodiments. System 900 includes data server 910, client applications 920 and 922 and administrator application 930. According to some embodiments, data server 910 operates to serve transactional and analytical data to client applications 920 and 922 based on requests received therefrom. System 900 may be implemented using any client-server architecture that is or becomes known, including but not limited to on-premise, cloud-based and hybrid architectures.

Server applications 911 are executed to provide functionality to client applications 920 and 922. Server applications 911 may retrieve data from data store 912 in order to provide such functionality. Server applications 911 are illustrated as executed completely on the database platform of data server 910. In some embodiments, server applications 911 may be executed on a platform which is separate from the remaining elements of data server 910.

Server applications 911 may present queries to query processor 913 in order to create, retrieve, update, or delete data stored in data store 912. Query processor 913 may comprise any query-responsive processor that is or becomes known, including but not limited to a structured-query language (SQL) processor.

In order to serve the received queries, query processor 913 may request primary key information from primary key determination component 914. Component 914 may utilize statistics service 915, or metadata generated thereby, to determine a primary key for a given database table. According to some embodiments, server applications 911 may request primary key information directly from component 914. In still other embodiments, primary key determination component 914 may execute in the background to generate metadata identifying primary keys for various database tables. Such metadata may then be available from data store 912 for use by other components of data server 910.

Data server 910 may implement an "in-memory" database, in which the database tables are primarily stored in volatile (e.g., non-disk-based) memory (e.g., Random Access Memory) and data is accessed therefrom and updated therein. The full database may be persisted in and/or backed up to fixed disks (not shown).

Data server 910 may comprise a relational database, a multi-dimensional database, an eXtendable Markup Language (XML) document, or any other data storage system storing structured and/or unstructured data. The data of data server 910 may be distributed among several relational databases, dimensional databases, and/or other data sources. Embodiments are not limited to any number or types of data sources.

In order to shield a user from the complexities of the underlying database schema, metadata of data store 912 may associate intuitively-named logical objects with one or more physical entities (e.g., a physical database table, associated columns of one or more database tables). These objects may be classified as dimensions, along which one may want to perform an analysis or report (e.g., Year, Country, Product), or measures (e.g., Sales, Profit), whose values can be determined for a given combination of dimension members. As a result, data server 910 may efficiently process the query "Sales by Country" received from client application 920 or 922.

Data store 912 may comprise one or more non-volatile data storage units (e.g., fixed disks) storing a relational database, a multi-dimensional database, an eXtendable Markup Language (i.e., XML) document, or any other structured and/or unstructured data. Data store 812 may also store log volumes, data backups, and/or other suitable data. The data of data store 812 may be distributed among several non-volatile data storage units. Embodiments are not limited to any number or types of non-volatile data storage units.

Client applications 920 and 922 may be executed by one or more devices and may comprise program code for presenting user interfaces to allow interaction with data server 910. Presentation of a user interface may comprise any degree or type of rendering, depending on the type of user interface code generated by data server 910. For example, client application 920 may comprise a Web Browser to receive a Web page (e.g., in HTML format) from data server 910, and may render and present the Web page according to known protocols. Client applications 920 and 922 may also or alternatively present user interfaces by executing a stand-alone executable file (e.g., an .exe file) or code (e.g., a JAVA applet) within a virtual machine.

Although embodiments are described with respect to data server 910, which reflects "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 900 may also or alternatively support multi-tenancy by providing multiple logical database systems which are programmatically isolated from one another.

Figure 10:
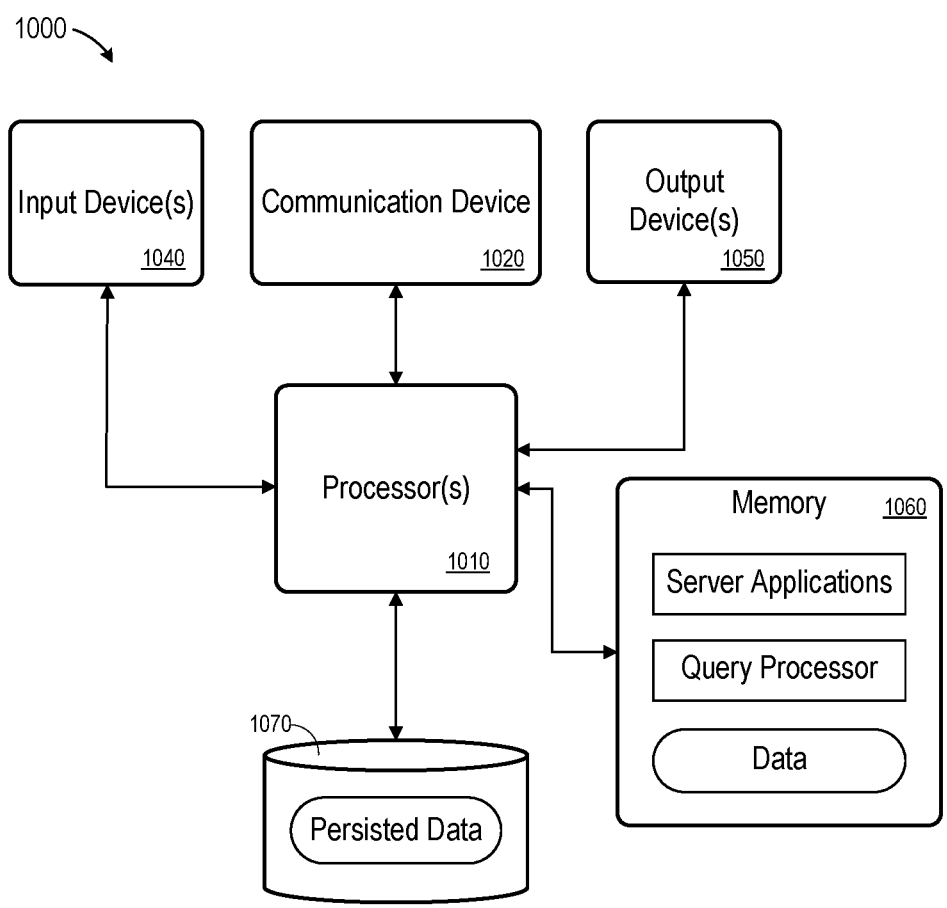
FIG. 10 is a block diagram of a computing system according to some embodiments.

FIG. 10 is a block diagram of apparatus 1000 according to some embodiments. Apparatus 1000 may comprise a general-purpose computing apparatus or computing system and may execute program code to perform any of the functions described herein. Apparatus 1000 may comprise an implementation of data server 810 in some embodiments. Apparatus 1000 may include other unshown elements according to some embodiments.

Apparatus 1000 includes processor(s) 1010 operatively coupled to communication device 1020, one or more input devices 1040, one or more output devices 1050, memory 1060, and persistent storage 1070. Communication device 1020 may facilitate communication with external devices, such as a reporting client, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen), a speaker, and/or a printer.

Memory 1060 may comprise Random Access Memory (RAM) and may store program code of server applications, a query processor, a statistics service, and a primary key determination component for execution by processor(s) 1010. During operation of system 1000, memory 1060 may also store in-memory database tables and metadata defining the structure, properties and dependencies of the database tables.

Persistent storage 1070 may comprise any appropriate persistent storage device for storing backups, logs, etc., including combinations of magnetic storage devices (e.g., magnetic tape, hard disk drives and flash memory), optical storage devices, and Read Only Memory (ROM) devices.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
    a memory including a first table comprising a plurality of columns and a plurality of column values associated with each of the plurality of columns; and
    a processor to execute processor-executable program code to:
        for each of the plurality of columns, determine a structural relationship with each other of the plurality of columns based on the plurality of column values associated with each of the plurality of columns; and
        determine one or more of the plurality of columns comprising a primary key of the first table based on the structural relationships.

2. A database system according to claim 1, wherein the structural relationships comprise at least one of one-to-one, one-to-many, and many-to-one.

3. A database system according to claim 1, the processor further to execute processor-executable program code to:
   determine a cardinality of each of the plurality of columns based on the plurality of column values associated with each of the plurality of columns,
   wherein determination of the primary key of the first table is based on the structural relationships and the determined cardinalities.

4. A database system according to claim 3, wherein determination of the one or more of the plurality of columns comprising the primary key of the first table comprises:
   generation of a list of the plurality of columns, ordered by descending cardinality;
   determination of whether a first column of the list has a one-to-one or many-to-one relationship with a second column ordered below the first column in the list; and
   if the first column of the plurality of columns has a one-to-one or one-to-many relationship with the second column of the plurality of columns, determine that the first column is a portion of the primary key and the second column is not a portion of the primary key.

5. A database system according to claim 1, wherein determination of the one or more of the plurality of columns comprising the primary key of the first table comprises:
   determination of whether a first column of the plurality of columns has a one-to-one or many-to-one relationship with a second column of the plurality of columns; and
   if the first column of the plurality of columns has a one-to-one or one-to-many relationship with the second column of the plurality of columns, determination that the first column is a portion of the primary key and the second column is not a portion of the primary key.

6. A database system according to claim 1, the processor further to execute processor-executable program code to:
   determine a plurality of combinations of the one or more of the plurality of columns comprising a primary key;
   for each of the plurality of combinations, determine a second structural relationship with each other of the plurality of columns; and
   determine a second one or more of the plurality of columns comprising a second primary key of the first table based on the second structural relationships.

7. A computer-implemented method for a database system comprising a first table comprising a plurality of columns and a plurality of column values associated with each of the plurality of columns, the method comprising:
   for each of the plurality of columns, determining a structural relationship with each other of the plurality of columns based on the plurality of column values associated with each of the plurality of columns; and
   determining one or more of the plurality of columns comprising a primary key of the first table based on the structural relationships.

8. A computer-implemented method according to claim 7, wherein the structural relationships comprise at least one of one-to-one, one-to-many, and many-to-one.

9. A computer-implemented method according to claim 7, further comprising:
   determining a cardinality of each of the plurality of columns based on the plurality of column values associated with each of the plurality of columns,
   wherein determining the primary key of the first table is based on the structural relationships and the determined cardinalities.

10. A computer-implemented method according to claim 9, wherein determining the one or more of the plurality of columns comprising the primary key of the first table comprises:
    generating a list of the plurality of columns, ordered by descending cardinality;
    determining whether a first column of the list has a one-to-one or many-to-one relationship with a second column ordered below the first column in the list; and
    if the first column of the plurality of columns has a one-to-one or one-to-many relationship with the second column of the plurality of columns, determining that the first column is a portion of the primary key and the second column is not a portion of the primary key.

11. A computer-implemented method according to claim 7, wherein determining the one or more of the plurality of columns comprising the primary key of the first table comprises:
    determining whether a first column of the plurality of columns has a one-to-one or many-to-one relationship with a second column of the plurality of columns; and
    if the first column of the plurality of columns has a one-to-one or one-to-many relationship with the second column of the plurality of columns, determining that the first column is a portion of the primary key and the second column is not a portion of the primary key.

12. A computer-implemented method according to claim 7, further comprising:
    determining a plurality of combinations of the one or more of the plurality of columns comprising a primary key;
    for each of the plurality of combinations, determining a second structural relationship with each other of the plurality of columns; and
    determining a second one or more of the plurality of columns comprising a second primary key of the first table based on the second structural relationships.

13. A non-transitory computer-readable medium storing processor-executable process steps which, when executed by a computing device, cause the computing device to:
    access a first table comprising a plurality of columns and a plurality of column values associated with each of the plurality of columns;
    for each of the plurality of columns, determine a structural relationship with each other of the plurality of columns based on the plurality of column values associated with each of the plurality of columns; and
    determine one or more of the plurality of columns comprising a primary key of the first table based on the structural relationships.

14. A computer-readable medium according to claim 13, wherein the structural relationships comprise at least one of one-to-one, one-to-many, and many-to-one.

15. A computer-readable medium according to claim 14, the processor-executable process steps which, when executed by a computing device, cause the computing device to:
    determine a cardinality of each of the plurality of columns based on the plurality of column values associated with each of the plurality of columns,
    wherein determination of the primary key of the first table is based on the structural relationships and the determined cardinalities.

16. A computer-readable medium according to claim 15, wherein determination of the one or more of the plurality of columns comprising the primary key of the first table comprises:

generation of a list of the plurality of columns, ordered by descending cardinality;

determination of whether a first column of the list has a one-to-one or many-to-one relationship with a second column ordered below the first column in the list; and if the first column of the plurality of columns has a one-to-one or one-to-many relationship with the second column of the plurality of columns, determination that the first column is a portion of the primary key and the second column is not a portion of the primary key.

17. A computer-readable medium according to claim 13, wherein determination of the one or more of the plurality of columns comprising the primary key of the first table comprises:

determination of whether a first column of the plurality of columns has a one-to-one or many-to-one relationship with a second column of the plurality of columns; and if the first column of the plurality of columns has a one-to-one or one-to-many relationship with the second column of the plurality of columns, determination that the first column is a portion of the primary key and the second column is not a portion of the primary key.

18. A computer-readable medium according to claim 13, the processor-executable process steps which, when executed by a computing device, cause the computing device to:

determine a plurality of combinations of the one or more of the plurality of columns comprising a primary key;

for each of the plurality of combinations, determine a second structural relationship with each other of the plurality of columns; and determine a second one or more of the plurality of columns comprising a second primary key of the first table based on the second structural relationships.

* * * * *